Figure 1:
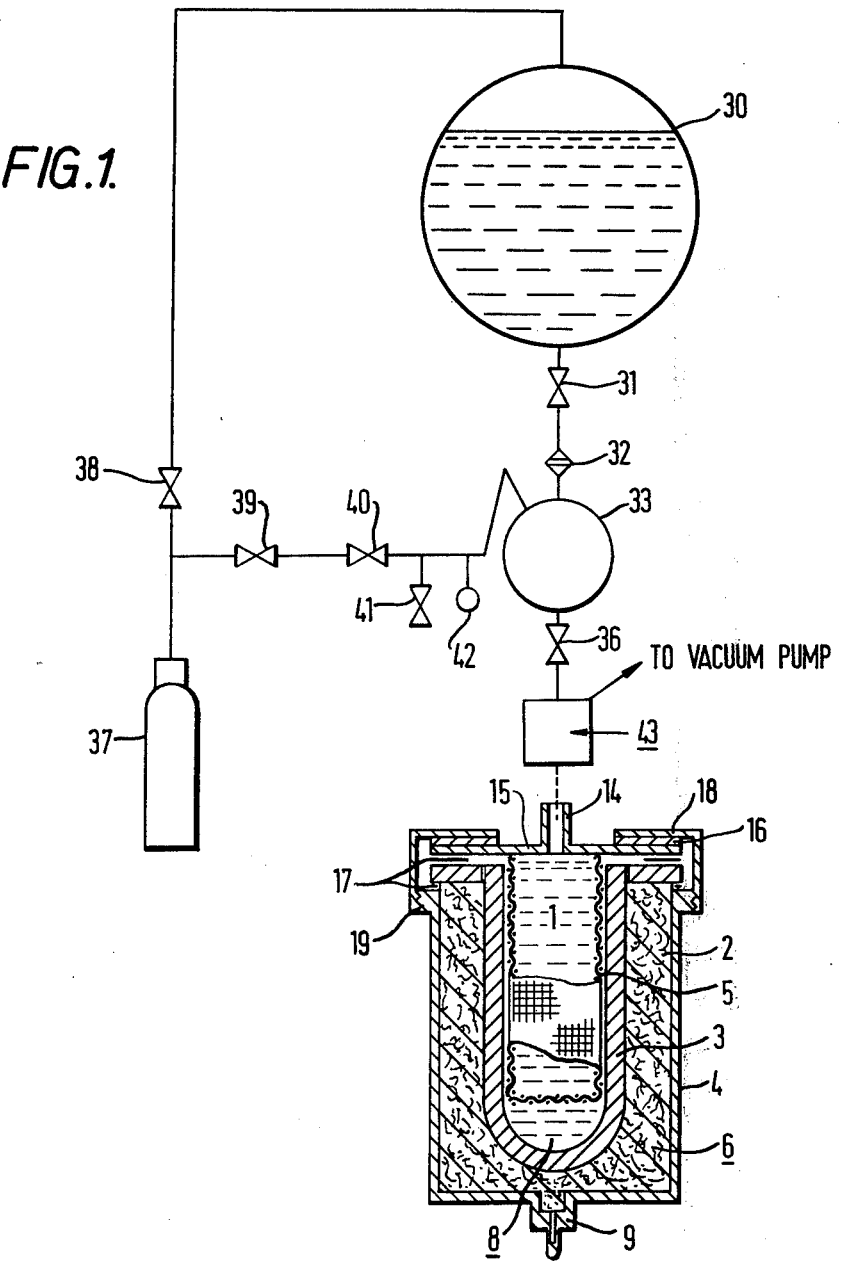

United States Patent [19]
Markin et al.

[11] 4,006,281
[45] Feb. 1, 1977

[54] ELECTRIC CELLS

[75] Inventors: Trevor Leslie Markin, Goring-on-Thames; Anthony Richard Junkison, Didcot, both of England

[73] Assignee: The Secretary of State for Industry in Her Britannic Majesty's Government of The United Kingdom of Great Britain and Northern Ireland, England

[22] Filed: June 30, 1975

[21] Appl. No.: 591,321

[30] Foreign Application Priority Data
July 5, 1974 United Kingdom ............ 30015/74

[52] U.S. Cl. ................................. 429/103; 429/104
[51] Int. Cl.² ........................................ H01M 43/00
[58] Field of Search ............... 136/6 F, 6 FS, 6 LF, 136/20, 83 R, 83 T, 100 R, 153, 175, 176, 181

[56] References Cited
UNITED STATES PATENTS
3,922,176  11/1975  Robinson et al. ............... 136/6 FS Primary Examiner—Anthony Skapars
Attorney, Agent, or Firm—Larson, Taylor and Hinds

[57] ABSTRACT

A method and apparatus is described for filling an electric cell which comprises a compartment for receiving a liquid electrode, an electrolyte, and a constraining means in the compartment for constraining the liquid electrode to wet a surface of the electrolyte. The method comprises the steps of introducing liquid electrode material into the compartment, thereby to contact the constraining means with the liquid electrode material. The liquid electrode material is then subjected to a pressure sufficient to force the liquid electrode material to penetrate the constraining means and thereby wet the electrolyte. The gas is maintained in the cell to ensure that the liquid electrode material remains in the constraining means.

18 Claims, 2 Drawing Figures

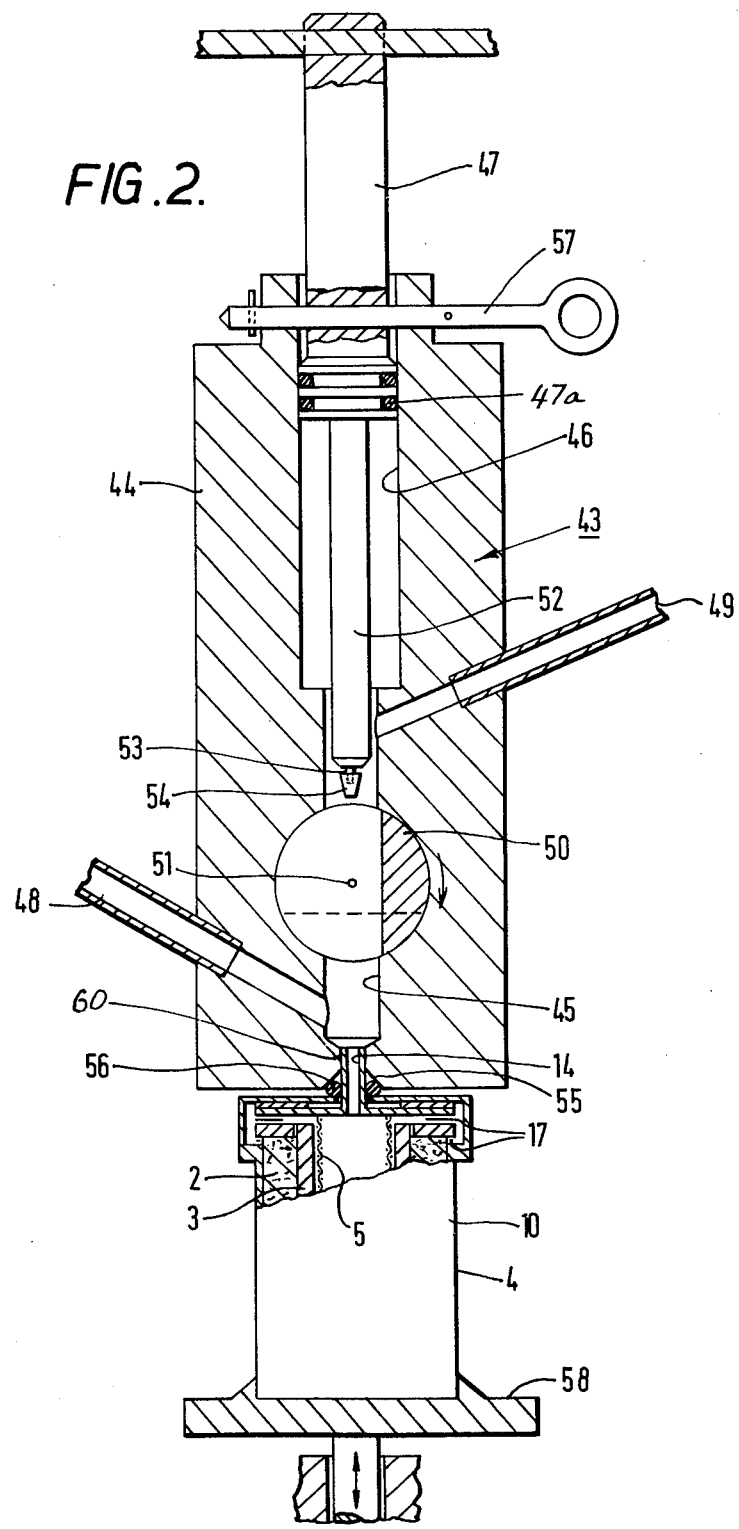

ELECTRIC CELLS

This invention relates to electric cells of the kind which in use have a compartment with a liquid anode, a compartment with a liquid cathode, a solid electrolyte between the anode and cathode, a current collecting means, and a constraining means for constraining the liquid anode by capillary action to "wet" that part of the surface of the solid electrolyte contiguous to the liquid anode compartment.

Examples of constraining means used to ensure that the liquid anode continues to wet the surface of the solid electrolyte as the level of the liquid anode falls during discharge of the electric cell are a wire mesh arrangement which acts as a wick, or a narrow annular space defined by a metal tube concentric with a tubular solid electrolyte.

Some liquid anode materials do not wet the materials used to construct the constraining means, or solid electrolytes, at the temperature at which the electric cell would normally be filled with the liquid anode during the construction of the said cell. In the case of an electric cell using sodium as the liquid anode, a steel wire mesh as the constraining means, and beta-alumina as the solid electrolyte, the electric cell would normally be filled at a temperature of approximately 150° C, since sodium is molten and flows readily at this temperature. However, sodium does not wet steel or beta-alumina at this temperature and since "wetting" is necessary for the aforesaid capillary action to occur, the liquid sodium will not penetrate the constraining means during the stage of filling the cell. The liquid sodium will only wet the steel and beta-alumina when heated to approximately 360° C which is the operating temperature of the electric cell, and at 360° C, it takes several hours for the liquid sodium to penetrate the constraining means under capillary action. In these circumstances there is an inevitable delay before the electric cell is able to produce its maximum electrical output.

It is therefore one of the objects of the invention to provide an electric cell in which the delay necessary to achieve penetration of a liquid electrode into the constraining means and wetting of the surface of the electrolyte is reduced.

According to one aspect of the present invention there is provided a method of filling an electric cell which comprises a compartment for receiving a liquid electrode, an electrolyte, and a constraining means in the compartment for constraining the liquid electrode to wet a surface of the electrolyte, the method comprising the steps of introducing into the compartment liquid electrode material, contacting the constraining means with the liquid electrode material, and subjecting the liquid electrode material to a pressure sufficient to force the liquid electrode material to penetrate the constraining means and thereby wet the electrolyte.

Preferably the liquid electrode material is pressurized by a gas which acts on the liquid, although it could be pressurised by a pressurising means, such as, for example, a piston which acts directly on the liquid.

Preferably the electric cell is evacuated before contacting the constraining means with the liquid electrode.

Preferably the liquid electrode is a heated liquid which solidifies on cooling. For example, the liquid electrode may be sodium or lithium.

The compartment of the cell may be partially filled with the liquid electrode material, an inert gas (which may be the same as that used to pressurise the liquid electrode material) admitted to the space above the liquid electrode, and the cell sealed to trap the gas in the compartment. The pressure of the gas is selected to be sufficient to ensure that the liquid electrode remains in the constraining means both before and during operation of the cell. In the case where the liquid electrode is allowed to solidify after the cell is filled and is subsequently re-heated to a molten state when the cell is required to be used to generate electrical power, the pressure of the gas above the electrode prior to re-heating the electrode to the molten state, should be selected to allow for the gas pressure to increase to a safe level without damaging the cell. Therefore, the pressure of the gas in the compartment may be above or below the pressure necessary to force the liquid electrode into the constraining means. The gas may be admitted to the space above the electrode whilst the electrode is a liquid or after it has solidified. Suitable gases are argon, helium or nitrogen.

According to a further aspect of the present invention there is provided apparatus for filling an electric cell which comprises a compartment for receiving a liquid electrode, an electrolyte, and a constraining means for constraining the liquid electrode material to wet the electrolyte, the apparatus comprising a measuring chamber for receiving liquid electrode material, the measuring chamber having means for connecting it to an electric cell, supply means for supplying liquid electrode material to the measuring chamber, means for subjecting the interior of said compartment to a reduced pressure, and pressurising means for subjecting the liquid electrode material to a pressure sufficient to force the liquid electrode material to penetrate the constraining means and thereby wet the electrolyte.

A feed container for holding a supply of the liquid electrode material may be connected to the measuring chamber.

The measuring chamber may be connected to the cell via a filling head which comprises a bore for communication with the interior of the compartment of the cell, a plunger located for sliding movement along the bore, the plunger being provided with means for carrying a plug for insertion in an inlet opening of the compartment of the cell, an obturating member located adjacent one end of the bore, the obturating member being provided for closing off the bore and being constructed so that it can be moved to a position where it does not impede the movement of the plunger along the bore past the obturating member, a first pipe communicating with the bore at a region between the obturating member and a region where the cell is to be connected, the first pipe being provided for supplying pressurised liquid electrode material to the cell, and a second pipe communicating with the bore at a region located on the other side of the obturating member to that where the first pipe enters the bore, the second pipe being provided for connecting a vacuum pump means to the interior of the compartment of the cell.

According to yet a further aspect of the present invention there is provided an electric cell comprising a compartment containing an electrode which during use of the cell is a liquid, an electrolyte in contact with the electrode, a constraining means for constraining the electrode, when it is in the liquid state, to wet the electrolyte, and gas at a pressure sufficient to ensure that the electrode, when it is in the liquid state, remains in the constraining means and thereby contacts the electrolyte.

The constraining means may be in the form of a wick or a wire mesh member in contact with the electrolyte. Alternatively the constraining means may be constituted by one or more small capillary gaps formed between a solid member and a solid electrolyte, for example, the electrolyte may be a hollow tubular member and the solid member a tubular member positioned concentrically inside or outside the electrolyte to define an annular capillary gap between the solid member and the electrolyte.

In one specific electric cell, the liquid electrode is sodium, the cell has a second compartment containing sulphur, and the electrolyte is positioned between the sodium and the sulphur.

In order than the invention may be more clearly understood, a method and apparatus for filling an electric cell in accordance with the invention will now be described, by way of an example only, with reference to the accompanying drawings in which FIG. 1 shows diagrammatically an electric cell, in lengthwise median section, and an apparatus for filling the cell in accordance with the present invention, and FIG. 2 shows the filling head of the apparatus of FIG. 1 for connection to a cell and for inserting a plug in the filled cell.

Referring now to FIG. 1, an electric cell 10 of the type described is of circular form in section and, in use, uses liquid sodium 1 as the liquid anode and liquid sulphur impregnated in a graphite felt 2 as the cathode. A tubular beta-alumina solid electrolyte 3 is disposed within an outer stainless steel casing 4 to define an outer annular compartment 6 for the liquid sulphur and graphite felt 2. The liquid sodium 1 is contained in an inner compartment 8 inside the tubular solid electrolyte 3. A wick 5 of stainless steel mesh of tubular form is disposed contiguous to the solid electrolyte 3 in the inner compartment 8 to act as constraining means on the liquid sodium 1, and is welded at one end to a stainless steel sealing cap 15. The solid electrolyte 3, casing 4, and the sealing cap 15, are conjoined by a threaded end cap 18 which engages with the screw thread on the shouldered portion 19 of the casing 4 using a "Sindanyo" insulating gasket 16, and "Grafoil" seals 17. (Sindanyo and Grafoil are Registered Trade Marks). A feed tube 14 for the inner compartment 8 projects from the sealing cap 15, and also acts as the negative terminal. A feed tube 9 for the outer compartment 6 is welded to the base of the casing 4, and also acts as the positive terminal.

The apparatus used for filling the electric cell 10 with liquid sodium 1 comprises a heated container 30 for liquid sodium 1, connected by a low alloy steel tube and valve 31, through a stainless steel mesh filter 32 to retain any sodium oxide, to a heated measuring chamber 33. The measuring chamber 33 is joined through a low alloy tube and valve 36 to feed tube 14. A cylinder 37 containing argon gas under pressure connects to the container 30, through a valve 38, and to the measuring chamber 33 through a tube having a pressure reducing valve 39, a control valve 40, a vent valve 41, and a pressure gauge 42.

Referring to FIG. 2 there is shown a filling head 43 for use with apparatus illustrated in FIG. 1. The filling head 43 comprised a body 44 which is provided with a central bore 45 passing completely through the body 44. The bore 45 is counter bored 46 to receive a plunger 47 and two pipes 48, 49 communicate with the bore 45.

Located in the bore 45 at a region between the pipes 48, 49 is an obturating member 50. The obturating member 50 is constructed in the form of a cylinder which is rotatable about an axis 51 passing transverse the central axis of the bore 45. The cylinder is machined away in the vicinity of where it actually passes through the bore 45 so as to leave, in cross-section in a plane transverse to its axis of rotation 51, a sector of a circle. The chord of the sector is positioned a sufficient distance from the axis of rotation 51 of the cylinder, so that when the obturating member 50 is rotated to align the chord in a plane which is parallel to the central axis of the bore, the plunger 47 can be pushed past the obturating member 50.

The plunger 47 is a sliding fit in the counter bored region 46 and is provided with O-ring seals 47a to provide a gas tight sliding seal between the plunger 47 and the body 44.

The plunger 47 has a portion 52 of reduced diameter which is of a smaller diameter that the bore 45 and is provided at its free end with a screw 53. The screw 53 is provided for temporarily carrying a tapered plug 54 for insertion in the inlet opening of the electric cell. The tapered plug 54 is provided with a threaded bore for screwing onto the screw 53.

A locking pin 57 which passes through holes in the body 44 and plunger 47 is provided to hold the plunger 47 in the withdrawn position shown.

The end of bore 45 that is remote from the counter bored region 46 is provided with a hole 60 for receiving the feed tube 14 of a cell to be filled, and is chamfered 55 to receive an O-ring seal 56 which is slid over the outside of the feed tube 14 of the cell.

A cell to be filled is positioned on a vertically movable table 58 and the table 58 is moved towards the filling head 43 to effect sealing engagement between the head 43 and the cell.

The pipe line from valve 36 of FIG. 1 is connected to the pipe 48 of the filling head 43 and the pipe line in FIG. 1 labelled "To vacuum pump" is connected to the pipe 49.

The method of filling the electric cell 10 with liquid sodium 1 comprises firstly applying a vacuum to the measuring chamber 33, which should be empty, and the inner compartment 8, using a vacuum pump means (not shown) connected to pipe 49 of the filling head 43, with the valves 31, 40 and 41 closed, valve 36 open and the obturating member 50 opened to the position shown in FIG. 2. The container 30, containing liquid sodium 1, the measuring chamber 33, and the electric cell, are heated to a temperature of approximately 150° C. Valve 36 is then closed, the container 30 is pressurized by opening valve 38, and valve 31 is opened to let in the required amount of liquid sodium 1 into the measuring chamber 33. The valves 31 and 38 are then closed. Valve 36 is then opened and obturating member 50 rotated through 90° to the closed position (shown by the dotted line in FIG. 2) to allow the liquid sodium 1 to pour into the inner compartment 8.

Valve 40 is then opened, with the pressure reducing valve 39 set at one atmosphere, to pressurise the liquid sodium 1 in the inner compartment 8 with argon thereby to force the liquid sodium 1 to flow through the spaces in the wick 5 onto the surface of the solid electrolyte 3. A pressure applied for a few minutes will suffice to ensure substantially complete penetration of the wick 5. Valve 40 is then closed and the measuring chamber 33 and the electric cell 10 are allowed to cool to the ambient temperature. The vent valve 41 is used as and when necessary to limit the gas pressure inside the inner compartment 8, and the apparatus, to approximately one atmosphere during the filling operation. When the electric cell 10 is at the ambient temperature, the valve 36 is closed, the obturating member 50 is rotated through 90° to the open position and a vacuum pump means is effectively reconnected to pipe 49 to evacuate the inner compartment 8 to reduce the argon pressure in the said inner compartment 8 to approximately 250 Torr, which is sufficient to maintain the liquid sodium 1 in the wick 5 until the electric cell 10 is heated in use to 360° C when capillary action of the liquid sodium 1 in the wick 5 occurs. The locking pin 57 is then removed and the plunger 47 is pushed inwards to force the tapered plug 54 into the inlet opening of the cell 10 to seal the cell 10. The plunger 47 is rotated to unscrew it from the tapered plug 54. The table 55 is then lowered and the cell 10 removed therefrom. The tapered plug 54 is subsequently welded to the feed tube 14 of the cell 10. Alternatively, the argon gas may be removed by the vacuum pump means prior to sealing the cell so as to leave the vacuum in the space above the liquid sodium 1 in the inner compartment 8, but some liquid sodium 1 may drain from the wick 5 until the electric cell 10 has been heated in use to 360° C and the capillary action occurs.

Although the invention has been described in relation to pressurising the liquid sodium 1 when it is in the inner compartment 8, the gas pressure may be applied before the valve 36 is opened, whilst the liquid sodium 1 is in the measuring chamber 33, so as to increase the rate at which the liquid sodium 1 is fed into the inner compartment 8, or to overcome any restrictions to flow at the entrance of the said inner compartment 8.

Naturally the invention is also applicable to electric cells having alternative constraining means, such as the aforesaid narrow annular space defined by a metal tube concentric with a tubular solid electrolyte. Also the position of the liquid anode relative to the liquid may be transposed so that the compartment for the liquid anode in part encompasses the compartment for the liquid cathode.

The invention is also applicable to other liquid anode materials where it is desired to ensure that they penetrate a constraining means within an electric cell when it is being filled. Other gases, such as helium or nitrogen, may be used provided that they do not react with the material used as the liquid anode.

We claim:

1. A method of filling an electric cell which comprises a compartment for receiving a liquid electrode, an electrolyte, and a constraining means in the compartment for constraining the liquid electrode to wet a surface of the electrolyte, the method comprising the steps of introducing into the compartment liquid electrode material, contacting the constraining means with the liquid electrode material, and subjecting the liquid electrode material to a pressure sufficient to force the liquid electrode material to penetrate the constraining means and thereby wet the electrolyte.

2. A method according to claim 1 wherein the liquid electrode material is pressurised by a pressurising means which acts directly on the liquid electrode material.

3. A method according to claim 1 wherein the liquid electrode material is pressurised by a gas which acts on the liquid.

4. A method according to claim 1 wherein the liquid electrode material is heated liquid which solidifies on cooling.

5. A method according to claim 4 wherein the liquid is sodium.

6. A method according to claim 1 wherein the compartment is partially filled with the liquid electrode material, a pressurised inert gas is admitted to the space above the liquid electrode and the compartment is then sealed to trap the pressurised gas in the compartment.

7. A method according to claim 6 wherein the gas trapped in the compartment is the same as that used to pressurise the liquid electrode material to force it to penetrate the constraining means.

8. A method according to claim 2 wherein the compartment is partially filled with the liquid electrode material, a pressurised gas at a pressure sufficient to force the liquid to penetrate into the constraining means is used to cause the liquid electrode to wet the electrolyte, the pressure of the gas is reduced to a value below that used to force the liquid electrode into the constraining means and the compartment is sealed to retain the gas in the compartment at the reduced pressure.

9. A method according to claim 4 wherein the compartment is partially filled with the liquid electrode material, the liquid electrode material is cooled to form a solid, the space above the solidified electrode material is partially evacuated, and then the compartment is sealed.

10. A method according to claim 4 wherein the compartment is partially filled with the liquid electrode material, the liquid electrode material is cooled to form a solid and the space above the solidified electrode is filled with an inert gas.

11. Apparatus for filling an electric cell which comprises a compartment for receiving a liquid electrode, an electrolyte, and a constraining means for constraining the liquid electrode material to wet the electrolyte, the apparatus comprising a measuring chamber for receiving liquid electrode material, the measuring chamber having means for connecting it to an electric cell, supply means for supplying liquid electrode material to the measuring chamber, means for subjecting the interior of said compartment to a reduced pressure, and pressurising means for subjecting the liquid electrode material to a pressure sufficient to force the liquid electrode material to penetrate the constraining means and thereby wet the electrolyte.

12. Apparatus according to claim 11, wherein a feed container is provided for holding a supply of liquid electrode material, and the feed container is connected to the measuring chamber.

13. An electric cell comprising a compartment containing an electrode which, during use of the cell, is a liquid, an electrolyte in contact with the electrode, and a constraining means for constraining the electrode, when the electrode is in the liquid state thereof, to wet the electrolyte, said compartment further containing a gas at a pressure sufficient to ensure that the electrode, when the electrode is in the liquid state thereof, penetrates the constraining means and thus contacts the electrolyte and remains in the constraining means irrespective of any capillary action of the constraining means.

14. An electric cell according to claim 13 wherein the constraining means is a wick in contact with the electrolyte.

15. An electric cell according to claim 13 wherein the constraining means is in the form of a wire mesh in contact with the electrolyte.

16. An electric cell according to claim 13, wherein the constraining means is constituted by at least one small capillary gaps formed between a solid member and a solid electrolyte.

17. An electric cell according to claim 16, wherein the electrolyte is a hollow tubular member, and the solid member is a tubular member positioned concentrically with respect to the electrolyte to define an annular capillary gap between the solid member and the electrolyte.

18. An electric cell according to claim 13, wherein the liquid electrode comprises sodium the cell has a second compartment containing sulphur, and the electrolyte is positioned between the sodium and the sulphur.

* * * * *